United States Patent
Marks et al.

(10) Patent No.: US 10,322,815 B1
(45) Date of Patent: Jun. 18, 2019

(54) STORED ELECTRICAL ENERGY ASSISTED RAM AIR TURBINE (RAT) SYSTEM

(71) Applicant: HAMILTON SUNDSTRAND CORPORATION, Charlotte, NC (US)

(72) Inventors: Scott J. Marks, Oregon, IL (US); William E. Seidel, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/933,045

(22) Filed: Mar. 22, 2018

(51) Int. Cl.
| | |
|---|---|
| *H02K 7/18* | (2006.01) |
| *H02P 9/02* | (2006.01) |
| *B64C 25/28* | (2006.01) |
| *B64D 43/02* | (2006.01) |
| *H02K 11/00* | (2016.01) |
| *H02K 7/116* | (2006.01) |
| *B64D 41/00* | (2006.01) |
| *B64D 45/00* | (2006.01) |
| *H02K 11/30* | (2016.01) |

(52) U.S. Cl.
CPC ............ *B64D 41/007* (2013.01); *B64C 25/28* (2013.01); *B64D 43/02* (2013.01); *B64D 45/0005* (2013.01); *H02K 7/116* (2013.01); *H02K 7/183* (2013.01); *H02K 11/0094* (2013.01); *H02K 11/30* (2016.01); *H02P 9/02* (2013.01); *B64D 2221/00* (2013.01)

(58) Field of Classification Search
USPC .......................... 322/34, 35; 244/58; 416/174
See application file for complete search history.

(56) References Cited

U.S. PATENT DOCUMENTS

| | | | | | |
|---|---|---|---|---|---|
| 4,230,979 | A | * | 10/1980 | Espelage | H02P 21/36 318/721 |
| 5,484,120 | A | * | 1/1996 | Blakeley | B64D 41/007 244/54 |
| 5,564,903 | A | * | 10/1996 | Eccles | F01D 25/164 416/174 |
| 5,820,074 | A | * | 10/1998 | Trommer | B64D 41/007 244/58 |
| 6,467,725 | B1 | * | 10/2002 | Coles | F01D 15/10 244/58 |
| 7,207,521 | B2 | * | 4/2007 | Atkey | B64D 13/06 244/58 |
| 7,210,653 | B2 | * | 5/2007 | Atkey | B64D 13/06 244/58 |
| 7,660,135 | B2 | * | 2/2010 | Fang | H02M 1/40 363/17 |

(Continued)

FOREIGN PATENT DOCUMENTS

RU 2598926 10/2016

*Primary Examiner* — Pedro J Cuevas
(74) *Attorney, Agent, or Firm* — Snell & Wilmer, L.L.P.

(57) ABSTRACT

A system for providing alternating current (AC) power to an aircraft component includes a ram air turbine (RAT) configured to generate AC power. The system also includes an energy storage device configured to output direct current (DC) power. The system also includes an inverter configured to convert the DC power to the AC power. The system also includes a controller coupled to the RAT and the inverter and configured to cause the inverter to provide the AC power to the aircraft component, and to control the RAT to provide the AC power to the aircraft component in response to determining that the RAT can provide the AC power.

18 Claims, 5 Drawing Sheets

(56) References Cited

U.S. PATENT DOCUMENTS

| | | | | |
|---|---|---|---|---|
| 8,302,902 B2* | 11/2012 | Lynas | .................... | B64C 25/22 244/102 R |
| 8,424,800 B2* | 4/2013 | Finney | ................ | B64D 41/007 244/53 R |
| 8,573,533 B2* | 11/2013 | Lynas | .................... | B64C 25/22 244/102 R |
| 8,575,900 B2* | 11/2013 | Spierling | ............... | B64D 15/12 322/33 |
| 8,708,275 B2* | 4/2014 | Belleville | ............... | B64C 25/36 244/113 |
| 8,816,625 B2* | 8/2014 | Kopiness | ............... | H02M 1/36 318/376 |
| 8,820,677 B2* | 9/2014 | Rajashekara | .......... | B64D 41/00 244/53 R |
| 9,296,487 B2* | 3/2016 | Larson, Jr. | ........... | B64D 41/007 |
| 9,573,697 B2 | 2/2017 | Craido et al. | | |
| 9,676,351 B2 | 6/2017 | Shander et al. | | |
| 9,787,210 B2* | 10/2017 | Patel | ...................... | H02M 5/44 |
| 9,789,973 B2 | 10/2017 | Swearingen et al. | | |
| 9,828,110 B2 | 11/2017 | Rogues | | |
| 9,868,515 B2 | 1/2018 | Nakagawa et al. | | |
| 10,099,772 B2* | 10/2018 | Bortoli | ................... | F01D 5/025 |
| 10,207,814 B2* | 2/2019 | Marks | ................. | B64D 41/007 |
| 2002/0154999 A1* | 10/2002 | Eccles | ................. | B64D 41/007 416/95 |
| 2006/0102790 A1* | 5/2006 | Atkey | .................... | B64D 13/06 244/134 R |
| 2007/0267540 A1* | 11/2007 | Atkey | .................... | B64D 13/06 244/58 |
| 2007/0284480 A1* | 12/2007 | Atkey | .................... | B64D 13/06 244/135 R |
| 2008/0291707 A1* | 11/2008 | Fang | ...................... | H02M 1/40 363/41 |
| 2009/0121077 A1* | 5/2009 | Lynas | .................... | B64C 25/22 244/58 |
| 2011/0236218 A1* | 9/2011 | Russ | .................... | B64D 41/007 416/246 |
| 2011/0315815 A1* | 12/2011 | Finney | ................... | B64D 41/00 244/58 |
| 2012/0056601 A1* | 3/2012 | Spierling | ............... | B64D 15/12 322/34 |
| 2012/0318914 A1* | 12/2012 | Rajashekara | .......... | B64D 41/00 244/58 |
| 2012/0328436 A1* | 12/2012 | Soidel | ................. | B64D 41/007 416/47 |
| 2013/0009000 A1* | 1/2013 | Lynas | .................... | B64C 25/22 244/58 |
| 2016/0122034 A1* | 5/2016 | Bortoli | ................ | B64D 41/007 416/142 |
| 2017/0349294 A1* | 12/2017 | Bortoli | ................ | B64D 41/007 |
| 2018/0029722 A1* | 2/2018 | Marks | ................. | B64D 41/007 |

* cited by examiner

STORED ELECTRICAL ENERGY ASSISTED RAM AIR TURBINE (RAT) SYSTEM

FIELD

The present disclosure relates to ram air turbines, and more particularly, to systems for supplementing AC power provided by ram air turbines.

BACKGROUND

Ram air turbines are generally used in aircraft to provide supplemental and/or emergency power to the aircraft by utilizing air flow to rotate a turbine. Ram air turbines may provide electrical power, hydraulic power, or both. Electrical ram air turbines produce electrical power by transferring the rotational energy of the turbine to a power conversion device, such as a generator. The power generated by the generator may be alternating current (AC) power and may be used to power aircraft components that are typically operated using AC power.

SUMMARY

Described herein is a system for providing alternating current (AC) power to an aircraft component. The system includes a ram air turbine (RAT) configured to generate AC power. The system also includes an energy storage device configured to output direct current (DC) power. The system also includes an inverter configured to convert the DC power to the AC power. The system also includes a controller coupled to the RAT and the inverter and configured to cause the inverter to provide the AC power to the aircraft component, and to control the RAT to provide the AC power to the aircraft component in response to determining that the RAT can provide the AC power.

In any of the foregoing embodiments, the controller is further configured to cause the RAT to deploy and to cause the inverter to provide the AC power to the aircraft component simultaneously.

In any of the foregoing embodiments, the controller is further configured to cause the RAT to deploy and to cause the inverter to provide the AC power to the aircraft component in response to determining a loss of aircraft standard power.

Any of the foregoing embodiments may also include a first switch coupled between the inverter and the aircraft component and a second switch coupled between the RAT and the aircraft component, and wherein the controller is configured to cause the inverter to provide the AC power to the aircraft component by closing the first switch, and to cause the RAT to provide the AC power to the aircraft component by closing the second switch.

In any of the foregoing embodiments, the controller is further configured to identify a low speed condition corresponding to a condition in which the RAT receives insufficient wind speed to provide the AC power to the aircraft component, and to cause the inverter to provide the AC power to the aircraft component in response to identifying the low speed condition.

In any of the foregoing embodiments, the low speed condition corresponds to deployment of landing gear of a corresponding aircraft.

In any of the foregoing embodiments, the controller is further configured to identify a sufficient wind speed condition corresponding to a new condition in which the RAT receives sufficient wind speed to provide the AC power to the aircraft component, and to cause the RAT to provide the AC power to the aircraft component in response to identifying the sufficient wind speed condition.

Any of the foregoing embodiments may also include a RAT power sensor configured to detect a detected RAT power corresponding to an amount of the AC power provided by the RAT, and wherein the controller is configured to identify the low speed condition based on the detected RAT power.

In any of the foregoing embodiments, the controller is further configured to control the inverter to adjust a voltage, frequency, and phase to match that of the AC power that is output by the RAT prior to controlling the RAT to provide the AC power to the aircraft component.

In any of the foregoing embodiments, the controller is further configured to identify a peak load condition corresponding to a condition in which the aircraft component is requesting increased AC power, and to control the inverter and the RAT to provide the AC power simultaneously in response to identifying the peak load condition.

In any of the foregoing embodiments, the controller is further configured to identify a light load condition corresponding to a condition in which the aircraft component is requesting reduced AC power, and to control the RAT to provided power to charge the energy storage device in response to identifying the light load condition.

Also disclosed is a system for providing alternating current (AC) power to an aircraft component. The system includes a ram air turbine (RAT) configured to generate AC power. The system also includes an energy storage device configured to output direct current (DC) power. The system also includes an inverter configured to convert the DC power to the AC power. The system also includes a controller coupled to the RAT and the inverter and configured to identify a low speed condition corresponding to a condition in which the RAT receives insufficient wind speed to provide the AC power to the aircraft component, and to cause the inverter to provide the AC power to the aircraft component in response to identifying the low speed condition.

In any of the foregoing embodiments, the controller is further configured to identify a sufficient wind speed condition corresponding to a new condition in which the RAT receives sufficient wind speed to provide the AC power to the aircraft component, and to cause the RAT to provide the AC power to the aircraft component in response to identifying the sufficient wind speed condition.

Any of the foregoing embodiments may also include a RAT power sensor configured to detect a detected RAT power corresponding to an amount of the AC power provided by the RAT, and wherein the controller is configured to identify the low speed condition based on the detected RAT power.

In any of the foregoing embodiments, the controller is further configured to cause the inverter to provide the AC power to the aircraft component, and to control the RAT to provide the AC power to the aircraft component in response to determining that the RAT can provide the AC power.

In any of the foregoing embodiments, the controller is further configured to cause the RAT to deploy and to cause the inverter to provide the AC power to the aircraft component in response to determining a loss of aircraft standard power.

Any of the foregoing embodiments may also include a first switch coupled between the inverter and the aircraft component and a second switch coupled between the RAT and the aircraft component, and wherein the controller is configured to cause the inverter to provide the AC power to the aircraft component by closing the first switch, and to cause the RAT to provide the AC power to the aircraft component by closing the second switch.

Also disclosed is a method for providing alternating current (AC) power to an aircraft component. The method includes determining, by a controller, a loss of aircraft standard power. The method also includes controlling, by the controller, an inverter to provide the AC power to the aircraft component in response to determining the loss of aircraft standard power. The method also includes controlling, by the controller, a ram air turbine (RAT) to provide the AC power to the aircraft component in response to determining that the RAT can provide the AC power.

Any of the foregoing embodiments may also include identifying, by the controller, a low speed condition corresponding to a condition in which the RAT receives insufficient wind speed to provide the AC power to the aircraft component; and causing, by the controller, the inverter to provide the AC power to the aircraft component in response to identifying the low speed condition.

Any of the foregoing embodiments may also include identifying, by the controller, a sufficient wind speed condition corresponding to a new condition in which the RAT receives sufficient wind speed to provide the AC power to the aircraft component; and causing, by the controller, the RAT to provide the AC power to the aircraft component in response to identifying the sufficient wind speed condition.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
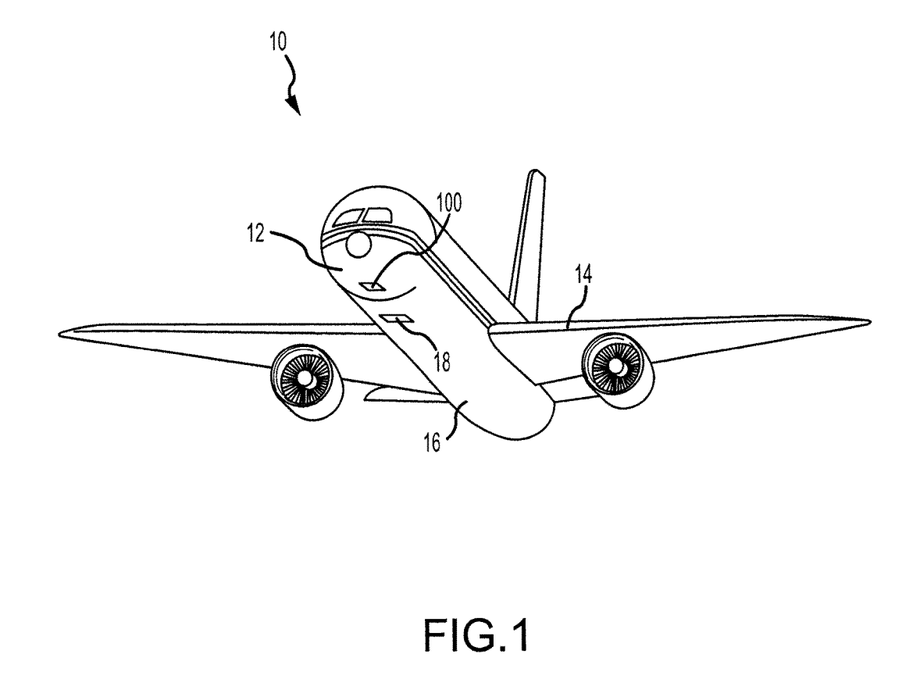
FIG. 1 illustrates a perspective view of an aircraft, in accordance with various embodiments.

In various embodiments and with reference to FIG. 1, an aircraft 10 may comprise wings 14 and a fuselage 16 having a nose 12. A ram air turbine 100 may be located within the fuselage 16, the nose 12, or the wings 14, and when desired, the ram air turbine 100 may be deployed into the path of airflow. The aircraft 10 may further include landing gear 18 that may be retractable (i.e., may be stowed in the fuselage 16 and then deployed prior to landing).

Figure 2:
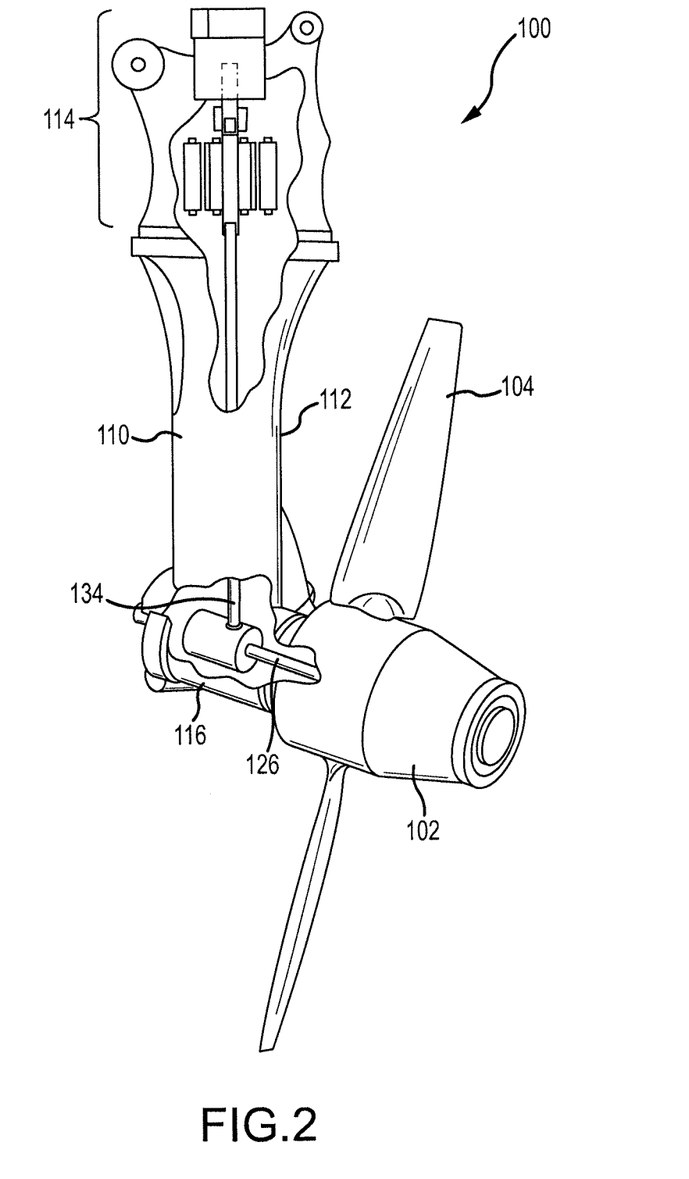
FIG. 2 illustrates a ram air turbine of an aircraft including a power conversion adapter section, a turbine section and a gearbox section, in accordance with various embodiments.

With reference to FIG. 2, the ram air turbine 100, or RAT 100, may comprise a turbine 102 having one or more blades 104. In various embodiments, the turbine 102 is coupled to a gearbox 116 which is also coupled to a strut 110. For example, the strut 110 may be rotatably connected to the rear of the turbine 102 through a turbine shaft 126.

In various embodiments, the strut 110 may be coupled to a power conversion adapter section 114. The power conversion adapter section 114 may include a generator adapter section, however, the power conversion adapter section 114 is not limited to any particular power conversion device. Rotational energy from the turbine shaft 126 may transfer through the gearbox section 116 and a strut shaft 134 to the power conversion adapter section 114.

The gearbox section 116 comprises a turbine shaft 126. The turbine shaft 126 may be removably coupled to the turbine 102, allowing the turbine shaft 126 to rotate with turbine blades 104. The gearbox section 116 may include a bearing located at an opposite end of the turbine 102. In such embodiments, the bearing may receive an end of the turbine shaft 126.

Rotation of the turbine shaft 126 may result in power generation. In particular, the RAT 100 may generate alternating current (AC) power. The RAT may deploy in response to loss of aircraft standard power in order to provide electrical power to the aircraft 10 of FIG. 1.

Figure 3:
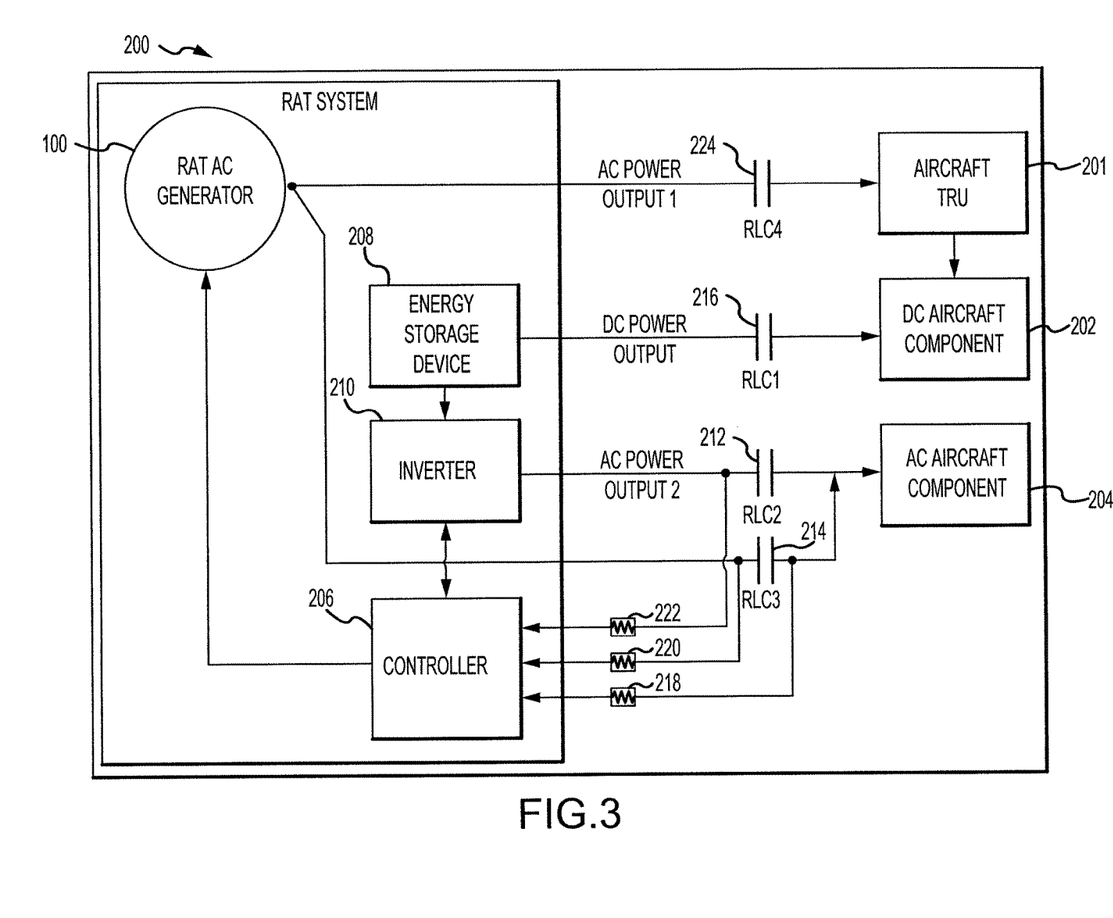
FIG. 3 is a block diagram illustrating a system for providing alternating current (AC) power to aircraft components, in accordance with various embodiments.

Turning now to FIG. 3, a system 200 for providing power to aircraft components, such as AC power to an AC aircraft component 204 (such as a flight computer, critical heating elements such as pilot tube heaters, aisle lighting, or the like that is designed to be powered using AC power), is shown. The system 200 may be implemented in an aircraft, such as the aircraft 10 of FIG. 1.

The system 200 includes the RAT 100. Because the RAT 100 provides AC power, the RAT 100 may provide AC power to the AC aircraft component 204.

The system 200 may further include an aircraft transformer rectifier unit (aircraft TRU) 201. The aircraft TRU 201 may convert the AC power from the RAT 100 into direct current (DC) power for powering one or more DC aircraft component 202 (a component on an aircraft that is designed to be powered using DC power). The controller 206 may further control the power from the RAT 100 by controlling an AC power output contactor (RLC4, or fourth switch) 224 to provide the AC power to the aircraft TRU 201.

In various embodiments and in response to loss of aircraft standard power, it may take the RAT 100 a certain amount of time, such as 1 second, 2 seconds, 3 seconds, or the like, to become fully deployed and provide the AC power. In that regard, the system 200 may further include an energy storage device 208, such as a battery, a capacitor, a super capacitor, or another energy storage device. The energy storage device 208 may be designed to store electrical energy and output the electrical energy as DC power.

The system 200 may further include a controller 206. The controller 206 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 206 may further include any non-transitory memory known in the art. The memory may store instructions usable by the logic device to perform operations.

The controller 206 may identify a point in time at which the aircraft loses aircraft standard power. In response to determining the loss of aircraft standard power, the controller 206 may cause the RAT 100 to deploy. The controller 206 may further control the power from the energy storage device 208 by controlling the DC power output contactor 216 to provide the DC power to the DC aircraft component 202.

During the time of deployment of the RAT 100, it may be desirable for the AC aircraft component 204 to receive power. In that regard, the system 200 may further include an inverter 210. The inverter 210 may receive DC power from the energy storage device 208 and may convert the DC power into AC power. In that regard, the controller 206 may simultaneously cause the RAT 100 to deploy and may cause the inverter 210 to provide the AC power to the AC aircraft component 204 in response to determining the loss of aircraft standard power.

The controller 206 may further be capable of identifying a time at which the RAT 100 is deployed and capable of providing the AC power. This condition may be referred to as a sufficient wind speed condition. In response to identification of this time (i.e., in response to identification of the sufficient wind speed condition), the controller 206 may control the inverter 210 to adjust a voltage, frequency, and phase to match the voltage, frequency, and phase of the AC power provided by the RAT 100. In response to determining that the inverter 210 is providing AC power that matches that of the RAT 100 (and in response to determining that the RAT can provide the AC power), the controller 206 may cause a momentary paralleling of AC power from the inverter 210 and the RAT 100. The inverter 210 may then cease providing the AC power to the AC aircraft component 204 and may cause the RAT 100 to begin providing the AC power to the AC aircraft component 204.

The system 200 may include a plurality of switches including a first switch 212, a second switch 214, a third switch 216, and a fourth switch 224. The controller 206 may be coupled to each of the switches 212, 214, 216, 224 and may control the switches 212, 214, 216 based on desirable operation. For example, the first switch 212 may be located between the inverter 210 and the AC aircraft component 204, the second switch 214 may be located between the RAT 100 and the AC aircraft component 204, the third switch 216 may be located between the energy storage device 208 and the DC aircraft component 202, and the fourth switch 224 may be located between the RAT 100 and the aircraft TRU 201.

The controller 206 may cause the inverter 210 to provide the AC power to the AC aircraft component 204 by causing the first switch 212 to close, and may cause the inverter 210 to cease providing the AC power to the AC aircraft component 204 by causing the first switch 212 to open. Likewise, the controller 206 may cause the RAT 100 to provide the AC power to the AC aircraft component 204 by causing the second switch 214 to close, and may cause the RAT 100 to cease providing the AC power to the AC aircraft component 204 by causing the second switch 214 to open. The controller 206 may likewise control the third switch 216 to control power distribution between the energy storage device 208 and the DC aircraft component 202. The controller 206 may likewise control the fourth switch 224 to control power distribution between the RAT 100 and the aircraft TRU 201.

The system 200 may further include a plurality of sensors including a RAT power sensor 218, a RAT pre-switch power sensor 220, and an inverter power sensor 222. The RAT power sensor 218 may detect a detected RAT power corresponding to an amount of AC power output by the RAT 100 in response to the second switch 214 being closed. The RAT pre-switch power sensor 220 may detect a detected RAT power corresponding to an amount of AC power output by the RAT 100 in any condition. The inverter power sensor 222 may detect an amount of AC power output by the inverter 210. Any of the power sensors 218, 220, 222 may detect additional data corresponding to the power such as voltage, amperage, frequency, and phase of the AC power.

The controller 206 may identify a time at which the RAT 100 is capable of providing the AC power by monitoring the RAT pre-switch power sensor 220. For example, in response to the RAT pre-switch power sensor 220 detecting a power level that is above a threshold power level, the controller 206 may determine that the RAT 100 is capable of providing the AC power to power the AC aircraft component 204.

The controller 206 may likewise use the data detected by the power sensors 218, 220, 222 to control the features of the AC power output by the inverter 210 to match the features of the AC power output by the RAT 100. For example, the controller 206 may identify the voltage, frequency, and phase of the power sensed by the RAT pre-switch power sensor 220 and may control the inverter 210 to match the voltage, frequency, and phase. The controller 206 may further control the voltage, frequency, and phase of the AC power output by the inverter 210 based on feedback from the inverter power sensor 222.

Referring to FIGS. 1 and 3 and in some situations, wind speed received by the RAT 100 may be insufficient to provide the AC power to the AC aircraft component 204. Such a situation may be referred to as a low speed condition, indicating that the RAT 100 receives insufficient wind speed to provide the AC power to the AC aircraft component 204. For example, a low speed condition may be caused by deployment of the landing gear 18 as the landing gear 18 may disrupt the wind received by the RAT 100 during deployment.

In response to identifying the low speed condition, the controller 206 may close the first switch 212, causing the inverter 210 to provide the AC power to the AC aircraft component 204. The controller 206 may simultaneously open the second switch 214 to prevent the RAT 100 from providing the AC power to the AC aircraft component 204. In various embodiments, the controller 206 may control the inverter 210 to match the voltage, frequency, and phase of the AC power provided by the RAT 100 prior to at least one of closing the first switch 212 or opening the second switch 214.

In various embodiments, the controller 206 may identify the low speed condition based on data detected by the RAT power sensor 218. For example, if the RAT power sensor 218 detects a power value that is less than a threshold power value, then the controller 206 may determine that a low speed condition exists and may control the inverter 210 to provide the AC power to the AC aircraft component 204.

In various embodiments, the controller 206 may identify a sufficient wind speed condition corresponding to a condition in which the RAT 100 receives sufficient wind speed to provide the AC power to the AC aircraft component 204. For example, the sufficient wind speed condition may occur upon full deployment of the RAT 100, may occur upon full deployment of the landing gear $18|_{[JT1]}$ (e.g., if the landing gear 18 fails to interrupt the wind speed received by the RAT 100 when fully deployed), or the like. The controller 206 may cause the RAT 100 to provide the AC power to the AC aircraft component 204 in response to identifying the sufficient wind speed condition. In various embodiments, the controller 206 may identify the sufficient wind speed condition based on data detected by the RAT pre-switch power sensor 220 (or the RAT power sensor 218).

In various embodiments and returning reference to FIG. 3, the controller 206 may identify a peak load condition corresponding to a condition in which the AC aircraft component 204 is requesting an increased amount of AC power. For example, the peak load condition may correspond to a time in which the AC aircraft component 204 is requesting more power than the RAT 100 is capable of providing. As another example, the peak load condition may simply correspond to an increased power request from the AC aircraft component 204. In response to identifying the peak load condition, the controller 206 may cause the first switch 212 and the second switch 214 to close to allow both the RAT 100 and the inverter 210 to power the AC aircraft component 204.

In various embodiments, the controller 206 may identify a light load condition corresponding to a condition in which the AC aircraft component 204 is requesting a reduced amount of AC power. For example, the AC aircraft component 204 may be requesting an amount of AC power that is less than the amount of AC power provided by the RAT 100. In response to identifying the light load condition, the controller 206 may control the RAT 100 to provide power to the energy storage device 208 in order to charge the energy storage device 208. For example, the RAT 100 may provide AC power to the inverter 210, which may convert the power into DC power and provide the DC power to the energy storage device for storage. In various embodiments, the controller may monitor the charge level of the energy storage device 208 and may cause the RAT 100 to cease providing power to charge the energy storage device 208 when the state of charge of the energy storage device reaches or exceeds a threshold state of charge level.

Figure 4:
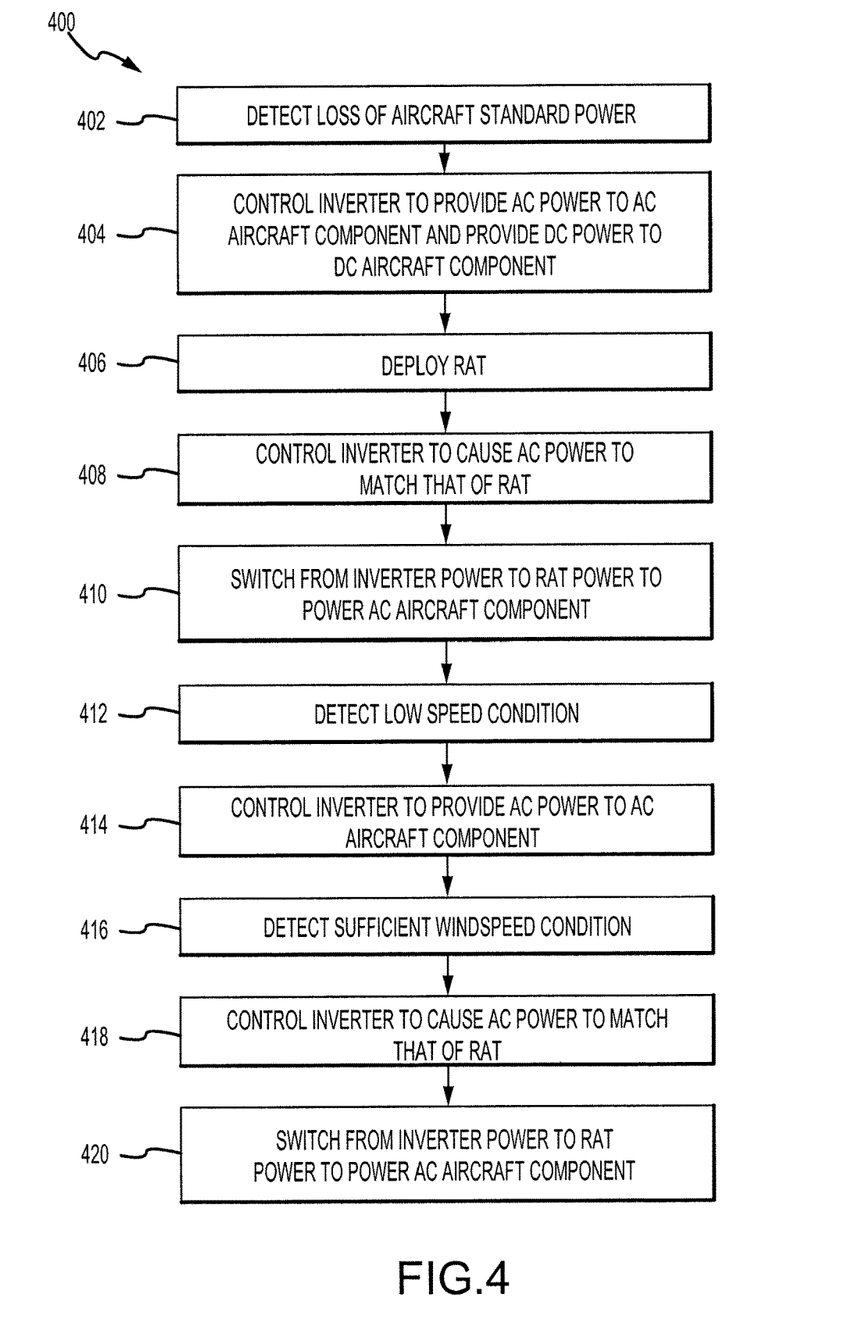
FIG. 4 is a flowchart illustrating a method for providing AC power to aircraft components, in accordance with various embodiments.

Turning to FIG. 4, a method 400 for providing AC power to an aircraft component is shown. The method 400 may be performed by a system similar to the system 200 of FIG. 3.

In block 402, the controller may detect or determine a loss of aircraft standard power. For example, the controller may lose communication with an aircraft computer, the controller may receive a signal indicating the loss of the aircraft standard power, or the like.

In block 404 and in response to determining the loss of aircraft standard power, the controller may control the inverter to provide AC power to the AC aircraft component, and may control an energy storage device to provide DC power to a DC aircraft component.

In block 406 and in response to determining the loss of aircraft standard power, the controller may cause the RAT to deploy.

In block 408, the controller may control the inverter to cause the AC power output by the inverter to match the AC power that is output by the RAT. For example, the controller may cause the inverter to match the voltage, frequency, and phase of the AC power that is output by the RAT.

In block 410, the controller may control the RAT 100 and the inverter to switch such that the RAT provides the AC power to the AC aircraft component rather than the inverter providing the AC power.

In block 412, the controller may detect or identify a low speed condition. For example, the low speed condition may correspond to deployment of landing gear of a corresponding aircraft.

In block 414, the controller may control the inverter to provide the AC power to the AC aircraft component in response to determining the low speed condition.

In block 416, the controller may detect a sufficient wind speed condition. In response and in block 418, the controller may control the inverter to cause the AC power output by the inverter to match the AC power output by that of the RAT. In block 420, the controller may again control the AC power output to switch from the inverter to the RAT such that the RAT again provides the AC power to the AC aircraft component.

Figure 5:
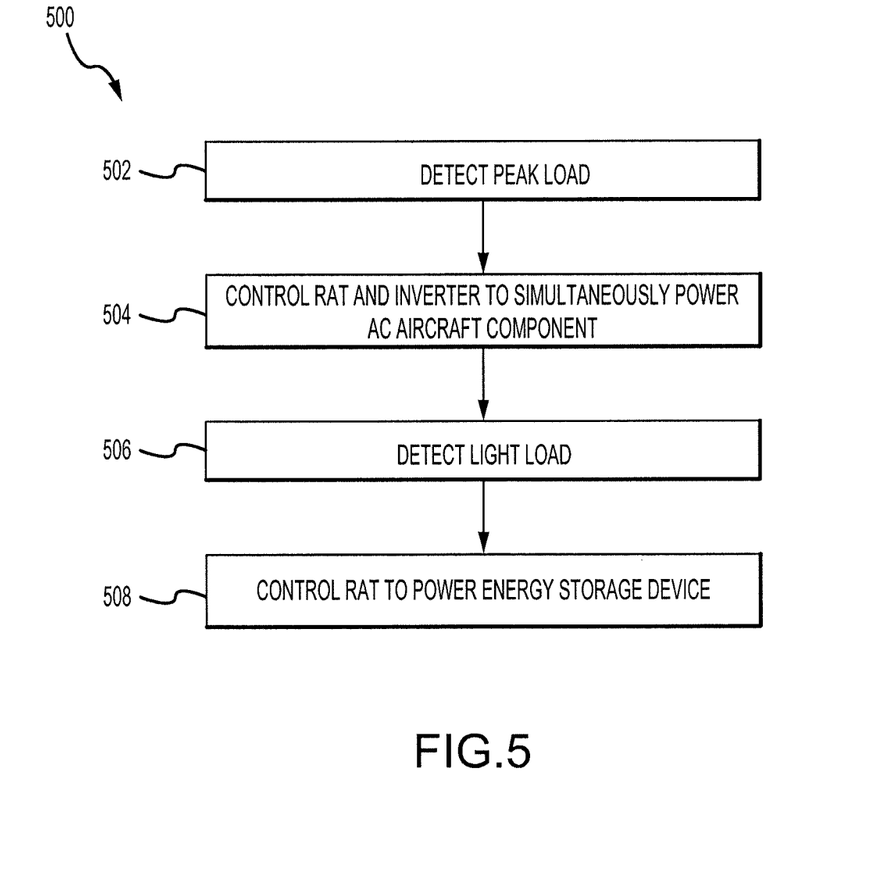
FIG. 5 is a flowchart illustrating a method for additional control of an emergency power system of an aircraft, in accordance with various embodiments.

Turning to FIG. 5, a method 500 for additional control of an emergency power system, such as the system 200 of FIG. 3, is shown. In block 502, a controller may detect or determine a peak load. The peak load may correspond to a situation in which a maximum amount of power is requested of a RAT. For example, the amount of power may be greater than the amount of power than the RAT can provide. In various embodiments, the RAT may be capable of providing the power during the peak load but the power request may be greater than normal.

In block 504 and in response to detecting or determining the peak load, the controller may control the RAT and an inverter to simultaneously provide AC power to an AC aircraft component. In various embodiments, this may include controlling the inverter to match the power output by the RAT, such as a voltage, frequency, and phase of the AC power.

In block 506, the controller may detect a light load. The light load may correspond to a load that is lighter than normal. In various embodiments, the light load may correspond to any load that is less than the power output by the RAT.

In block 508 and in response to detecting the light load, the controller may control the RAT to provide power to the energy storage device for storage. For example, the controller may control the RAT to provide the power to the energy storage device via the inverter such that the inverter can convert the AC power from the RAT into DC power for storage.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for providing alternating current (AC) power to an aircraft component, comprising:
   a ram air turbine (RAT) configured to generate AC power;
   an energy storage device configured to output direct current (DC) power;
   an inverter configured to convert the DC power to the AC power; and
   a controller coupled to the RAT and the inverter and configured to cause the inverter to provide the AC power to the aircraft component, and to control the RAT to provide the AC power to the aircraft component in response to determining that the RAT can provide the AC power,
   wherein the controller is further configured to control the inverter to adjust a voltage, frequency, and phase to match that of the AC power that is output by the RAT prior to controlling the RAT to provide the AC power to the aircraft component.

2. The system of claim 1, wherein the controller is further configured to cause the RAT to deploy and to cause the inverter to provide the AC power to the aircraft component simultaneously.

3. The system of claim 2, wherein the controller is further configured to cause the RAT to deploy and to cause the inverter to provide the AC power to the aircraft component in response to determining a loss of aircraft standard power.

4. The system of claim 1, further comprising a first switch coupled between the inverter and the aircraft component and a second switch coupled between the RAT and the aircraft component, and wherein the controller is configured to cause the inverter to provide the AC power to the aircraft component by closing the first switch, and to cause the RAT to provide the AC power to the aircraft component by closing the second switch.

5. The system of claim 1 wherein the controller is further configured to identify a low speed condition corresponding to a condition in which the RAT receives insufficient wind speed to provide the AC power to the aircraft component, and to cause the inverter to provide the AC power to the aircraft component in response to identifying the low speed condition.

6. The system of claim 5, wherein the low speed condition corresponds to deployment of landing gear of a corresponding aircraft.

7. The system of claim 5, wherein the controller is further configured to identify a sufficient wind speed condition corresponding to a new condition in which the RAT receives sufficient wind speed to provide the AC power to the aircraft component, and to cause the RAT to provide the AC power to the aircraft component in response to identifying the sufficient wind speed condition.

8. The system of claim 5, further comprising a RAT power sensor configured to detect a detected RAT power corresponding to an amount of the AC power provided by the RAT, and wherein the controller is configured to identify the low speed condition based on the detected RAT power.

9. The system of claim 1, wherein the controller is further configured to identify a peak load condition corresponding to a condition in which the aircraft component is requesting increased AC power, and to control the inverter and the RAT to provide the AC power simultaneously in response to identifying the peak load condition.

10. The system of claim 1, wherein the controller is further configured to identify a light load condition corresponding to a condition in which the aircraft component is requesting reduced AC power, and to control the RAT to provided power to charge the energy storage device in response to identifying the light load condition.

11. A system for providing alternating current (AC) power to an aircraft component, comprising:
   a ram air turbine (RAT) configured to generate AC power;
   an energy storage device configured to output direct current (DC) power;
   an inverter configured to convert the DC power to the AC power; and
   a controller coupled to the RAT and the inverter and configured to:
      cause the inverter to provide the AC power to the aircraft component,
      control the RAT to provide the AC power to the aircraft component in response to determining that the RAT can provide the AC power, identify a low speed condition corresponding to a condition in which the RAT receives insufficient wind speed to provide the AC power to the aircraft component, and cause the inverter to provide the AC power to the aircraft component in response to identifying the low speed condition, wherein the controller is further configured to control the inverter to adjust a voltage, frequency, and phase to match that of the AC power that is output by the RAT prior to controlling the RAT to provide the AC power to the aircraft component.

12. The system of claim 11, wherein the controller is further configured to identify a sufficient wind speed condition corresponding to a new condition in which the RAT receives sufficient wind speed to provide the AC power to the aircraft component, and to cause the RAT to provide the AC power to the aircraft component in response to identifying the sufficient wind speed condition.

13. The system of claim 11, further comprising a RAT power sensor configured to detect a detected RAT power corresponding to an amount of the AC power provided by the RAT, and wherein the controller is configured to identify the low speed condition based on the detected RAT power.

14. The system of claim 11, wherein the controller is further configured to cause the RAT to deploy and to cause the inverter to provide the AC power to the aircraft component in response to determining a loss of aircraft standard power.

15. The system of claim 11, further comprising a first switch coupled between the inverter and the aircraft component and a second switch coupled between the RAT and the aircraft component, and wherein the controller is configured to cause the inverter to provide the AC power to the aircraft component by closing the first switch, and to cause the RAT to provide the AC power to the aircraft component by closing the second switch.

16. A method for providing alternating current (AC) power to an aircraft component, comprising:

determining, by a controller, a loss of aircraft standard power;

controlling, by the controller, an inverter to provide the AC power to the aircraft component in response to determining the loss of aircraft standard power; and controlling, by the controller, a ram air turbine (RAT) to provide the AC power to the aircraft component in response to determining that the RAT can provide the AC power, wherein controlling the RAT to provide the AC power to the aircraft component includes controlling, by the controller, the inverter to adjust a voltage, frequency, and phase to match that of the AC power that is output by the RAT prior to controlling the RAT to provide the AC power to the aircraft component.

17. The method of claim 16, further comprising:

identifying, by the controller, a low speed condition corresponding to a condition in which the RAT receives insufficient wind speed to provide the AC power to the aircraft component; and causing, by the controller, the inverter to provide the AC power to the aircraft component in response to identifying the low speed condition.

18. The method of claim 17, further comprising:

identifying, by the controller, a sufficient wind speed condition corresponding to a new condition in which the RAT receives sufficient wind speed to provide the AC power to the aircraft component; and causing, by the controller, the RAT to provide the AC power to the aircraft component in response to identifying the sufficient wind speed condition.

* * * * *